United States Patent
Gmeiner

(10) Patent No.: US 7,220,331 B2
(45) Date of Patent: May 22, 2007

(54) DEVICE FOR CONNECTING A MULTILAYERED WEB BY ULTRASOUND

(76) Inventor: Josef Gmeiner, Sulzbacher Strasse 18, D-92729 Weiherhammer (DE)

( * ) Notice: Subject to any disclaimer, the term of this patent is extended or adjusted under 35 U.S.C. 154(b) by 67 days.

(21) Appl. No.: 10/496,064

(22) PCT Filed: Nov. 14, 2002

(86) PCT No.: PCT/EP02/12755

§ 371 (c)(1),
(2), (4) Date: May 19, 2004

(87) PCT Pub. No.: WO03/043807

PCT Pub. Date: May 30, 2003

(65) Prior Publication Data

US 2005/0016690 A1    Jan. 27, 2005

(30) Foreign Application Priority Data

Nov. 20, 2001 (DE) ................................ 101 56 104

(51) Int. Cl.
*B32B 37/00* (2006.01)
(52) U.S. Cl. .................... 156/73.1; 156/210; 156/292; 156/472; 156/580.2
(58) Field of Classification Search ................ 156/64, 156/73.1, 205, 210, 292, 470, 471, 472, 580.1, 156/580.2
See application file for complete search history.

(56) References Cited

U.S. PATENT DOCUMENTS 3,562,041 A    2/1971    Robertson
4,047,992 A    9/1977    Williams et al.
4,747,894 A    5/1988    Johnston et al.
5,620,545 A *  4/1997    Braun et al. ................ 156/205
5,711,847 A    1/1998    Rajala et al.
5,749,987 A    5/1998    Wannebo
5,961,778 A * 10/1999    Braun et al. ................ 156/471
6,010,766 A    1/2000    Braun et al.
6,494,976 B1* 12/2002    Hayashi et al. ............ 156/73.1

FOREIGN PATENT DOCUMENTS

| AU | 742361 | 1/2000 |
| DE | 4439284 C3 | 4/1996 |
| DE | 19954301 | 5/2001 |
| DE | 10027735 | 10/2001 |
| EP | 0916476 A1 | 5/1999 |
| EP | 1125846 A1 | 8/2001 |
| FR | 1264171 | 5/1961 |
| FR | 1382415 | 11/1964 |
| FR | 2285975 | 4/1976 |
| JP | 02253935 | 10/1998 |
| WO | WO 9938667 | 8/1999 |

OTHER PUBLICATIONS

German Patent Office Search Report, Oct. 15, 2002.
International Search Report, Feb. 26, 2003.

* cited by examiner

*Primary Examiner*—James Sells
(74) *Attorney, Agent, or Firm*—Dority & Manning, P.A.

(57) ABSTRACT

A device for connecting a multilayered material band by ultrasound in a first gap between a first ultrasonic device and at least one first responder is provided. A first, flat material band is introduced through a first feeding device and a second flat material band is introduced through a second feeding device into the first gap.

49 Claims, 5 Drawing Sheets

DEVICE FOR CONNECTING A MULTILAYERED WEB BY ULTRASOUND

FIELD OF THE INVENTION

The invention concerns a device for the binding together of a multilayered material band by means of exposure to ultrasonics in a gap. The gap is formed between an ultrasonic oscillator and an oppositely situated responder thereto.

BACKGROUND OF THE INVENTION

DE 44 39 284 C3 describes an apparatus for the continuous ultrasonic treatment of a material band by means of an ultrasonic oscillator and an oppositely situated responder. The produced material band can be composed of a varied multiplicity of layers, laid one on the other, which, as individual layers can be fed into a gap. In accord with the ultrasonic intensity in the gap, the band of layers can be bonded together or cut. Relative to the width of the band, the work-zone of bonding is narrow.

In another instance, DE 100 27 735 C1 discloses such an ultrasonic material band-processing apparatus, wherein an already loosely stratified, multilayer material band is introduced into a gap between an ultrasonic oscillator unit and an oppositely situated responder. The binding between the strata is carried out in an area of welding which is narrow as compared to the width of the band. By conducting the individually layered band through the gap, the loose, stratified layers are welded together, since each layer of the multiple strata is weldable and flexible. For this operation, thermoplastic layers are necessary, to meltingly react to the heat generated in the ultrasonic gap field and form a bond between the individual layers.

SUMMARY OF THE INVENTION

It is a principal purpose of the invention to provide a device for binding, by ultrasonic action, a multilayer material band, wherein a broader band of action of such an ultrasonic device is made possible. Additional aspects and advantages of the invention will be set forth in part in the following description, or may be obvious from the description, or may be learned through practice of the invention.

Briefly, the following possible areas of bonding are furnished by the device
- a continuous or discrete connection of large areas of the individual layers of the material band, which connections extend essentially over the entire width of the material band,
- the binding of the material band layers without the use of thermoplastic additives,
- the working of one or more of the layers of the material band and subsequent binding of the material band with the same equipment, that is to say, the same parts of the equipment,
- the optimizing of the energy expenditure during the use of ultrasonic binding in discrete or apportioned binding zones,
- the micro-splice joining of border edges of fiber containing material band layers which lie one upon the other, By the production of corrugated boxboard by means of a device in accord with one of the claims, it is possible to achieve one or more of the following advantages:
- a lessening of the moisture content input during the manufacture of the corrugated boxboard,
- a diminution of heat intake upon the binding of the material band layers,
- a lessening of the energy requirements upon the drying of the already bound boxboard,
- a lessening or the omission of a binding material band, such as an adhesive,
- substantial reduction of the installed size of the corrugating machine,
- faster reversal of the machine, especially by the omission or the reduction of necessary preheating phases, and
- the omission or the shortening of the run-in phase after restart of the equipment.

In the case of the device, a plurality of layers for a material band are bound together by ultrasonics in a gap between a first ultrasonic oscillator and at least one first oppositely positioned receptor. At least one, first, flat, individual material band is designed, along with a second, and these are respectively introduced by a first and a second feed apparatus into a first gap. Advantageously, the first and the second individual material bands are brought directly to the gap, or enter therein, ready for the multilayer binding procedure.

In one particular embodiment, the introduced second individual material band is supplied with corrugated profiling. Also, the introduced first or even additional individual material bands can be so profiled. Profiling is to be understood in that, the individual material band possesses a three dimensional, regular or irregular surface structure. Thus, the top or the bottom side of the second material band is not smooth, but is characterized by elevations and depressions. Advantageously, the profiling, relative to the travel path of the material band, is aligned either longitudinally or transversely. The profiling can be, for example, in straight lines, in zigzag formation, or in a wavelike configuration. For the manufacture of a durable binding structure, the profiled individual material band can be shaped in wave form or have sharp creases. This is in order that the individual material bands may bond into a rigid, lightweight structure.

Advantageously, the first ultrasonic oscillator is proximal to the first individual material band and the corresponding receptor borders the second individual material band. In this way, the ultrasonic oscillator lies near the surface of the first individual material band. The separation distance between the ultrasonic emitting surface of the first ultrasonic oscillator and the bonding zone between the first and the second, but profiled individual material band is then at its minimum.

If the second feed apparatus possesses a profiling roll-pair for the second individual material band, then it is possible that a binding between the first and the second individual material bands can be carried out in one apparatus with the advantage that the second individual material band is already profiled. The profiled roll-pair produces, for example, the above-mentioned profiling of the second individual material band. In the case of a profile, wherein the corrugations run transverse to the length of the material band, then the profile rolls have their own circumferential ridge and valley contours disposed parallel to their own axes. Conversely, if the profiling on the material band is to extend lengthwise, then the roll ridge and valley profiling will be circumferential. Advantageously, the profiling roll-pair can possess two ridge and valley rollers. Such rollers, for example, are known in the design of a corrugating line for corrugated boxboard.

In an exceptional embodiment, one of the profiled rolls of the profiled roll-pair acts as a responder to an ultrasonic oscillator. Thereby, the second individual material band is first impressed by the profile roll-pair and subsequently the profiling is in place to enhance the binding between the first and second individual material bands. On this account, no separate, specially designed counter responder is required for the first ultrasonic oscillator.

The peaks, or the extended projections, of the first profile roll, most closely approach the ultrasonic surface of the first ultrasonic oscillator. By means of an ultrasonic reflection surface, the ultrasonic radiation is principally reflected away from the profile roll and ultrasonic penetration into the profiling roll is minimized. Advantageously, the ultrasonic reflection surface at the area of the peaks or on the projections of the profiled roll are so designed, that the ultrasonic waves reflect into the gap. Thereby the supersonic impact pressure in the gap is increased. Thus, the sound to the first ultrasonic oscillator apparatus is reflected back, so that the field within the gap is increased even further. Thereby, the probability of an establishment of a standing-wave in the gap is improved.

For the first ultrasonic oscillator, a first generator unit is assigned, the power of which can be varied on a time scale, so that the power input modulations can be made to match the requirements of current bonding or bonding about to take place. The power draw can be lessened and likewise, the input of heat into the material band is correspondingly reduced. In this way, for example, discrete binding areas between the material bands can be created. Should a complete area of binding of the material bands be desired, then the above discrete binding zones can be distributed surfacewise over the width and length of the material band.

If the second individual material band has longitudinally disposed, periodic profiling, then, advantageously, the time-period of the changing of the power modulation is made by the first generator unit to correspond to that of the periodic profiling. This is done in concert with the rate of travel of the material band through the gap. Advantageously, the pulse length of the power modulation is in itself changeable, so that with a changing through-put speed of the material band, the pulse lengths can be made to coincide with one another. Advantageously, the service apparatus diminishes its power maximum, if a length of the material band is pulled through the gap, wherein the second individual material band lies upon the first individual material band. In this way, advantageously, power is brought into the length and/or energy is transferred into the material band, whereby also, in fact, binding between the bands occurs.

The power modulation can be done by inducing a beat. Therewith, a material band protective operation for an ultrasonic oscillator is made available, since no power peaks occur. Thus, excessive frequencies of the ultrasonic oscillator are avoided. The beat can be attained by means of modulations with the first generator unit itself. Alternatively, the modulation is achieved through a tuning between the exciting frequency for the ultrasonic oscillator and the inherent frequency of the ultrasonic oscillator. The frequency of the beat can be adjusted by the difference in frequency between the exciting frequency and the inherent frequency of the ultrasonic oscillator. In this way, a matching of the pulse length of the beat to the speed of the material band as it passes through the gap is enabled.

In an advantageous embodiment, a third feed apparatus conducts a third, individual material band into a second gap between a second ultrasonic oscillator and at least one second responder thereto. In the second gap, the material bands (for example, consisting of the bonded first and the second individual material bands) are bound to this third, additional, individual material band. In the case of one embodiment, the third individual material band can be directed to cover only the surface of the second individual material band. If the second individual material band is, for example, profiled, then it becomes possible, by means of the feed of a non-profiled third individual material band to construct a sandwich structure. Such constructions are customarily known in corrugated boxboard.

If the second ultrasonic oscillator is placed proximal to the third individual material band, then the ultrasonic emitting surface of the second ultrasonic oscillator borders on the contacting area between the second and the third individual material band. In some embodiments, the second responder, which coacts with the second ultrasonic oscillator, is itself a smooth roll or a profiled roll, which advantageously is provided with a profiling that is made to correspond to that of the first profile roll.

In one embodiment, a bowl-like depression in a ultrasonic reflection surface and/or the mentioned "hill", i.e., a projection of the ultrasonic reflection surface of a profile roll is filled with a substance, which has a lesser ultrasonic reflectivity than does the material of the ultrasonic reflection surface. Thereby, the ultrasonic sound penetrates from the gap through the filling material band and is reflected primarily from that side of the ultrasonic reflection surface, which is now behind the filling substance. By means of the filling of the bowl-like depression, an even or an outward extending convex surface is formed, so that, in the bowl, no contamination can accumulate. Conversely, by means of the filling over the reflection surface, a rise or a projection can result in a profiling, which matches that of the directly opposing roll, whereby the reflection is reinforced.

In another embodiment, the device has a first or a second displacing unit for the changing of the width of the first or the second gap. In this way, the gap can be made to fit different material band thicknesses. Also, the gap width adjustment can be done in such a manner, that with the chosen beat frequency of the first and/or the second ultrasonic oscillator, a standing wave, i.e., a resonance can be formed. The resonance conditioning, that is to say, the establishment of a standing wave can also be created within an unchanged gap by an alteration of the beat frequency. In the case of resonance, the sound wave pressure in the zone of the pressure node is at its greatest when the air or material band movement in the zone of pressure nodes is also at its greatest. By means of an alteration of the gap width and/or the excitation frequency, the position of the pressure node is displaced. If a pressure node is relocated into that area of the binding surfaces, then at that point the greatest material movement is produced.

In the case of another embodiment, the first or the second operational gap extends itself at least essentially over the entire width of the multilayered band. Advantageously, the first and/or the second ultrasonic oscillator is subdivided sectionwise, and possesses a plurality of ultrasonic beats, so that by means of ON and OFF switching, of individual ultrasonic beats or groups of ultrasonic beats, the field gap width can be adapted to the width of the material band. In this way, at least two layers of the material band can be bound together as a whole continuous surface, or in subdivided, discrete areas.

In another embodiment, by means of a layering apparatus, effective on the first, second and/or the third individual material band, a liquid can be applied, or so to say, can be provided as an additional coating. This liquid application can be done, for example, by means of a roll turning along the surface of the material band or by means of a spray gun or the like. One such liquid application on areas to be bound together between material bands, normally suffices. For an example of a liquid application, an aqueous film can be deposited on the ridges of the profiled, second individual material band, which are to be bound in the gap with the first and/or the second individual material band.

In still another embodiment, an additive apparatus is provided, which has an additional profile roll-pair for the profiling of yet another individual material band. Beside the profiled, second individual material band, therewith a further profiled individual material band is introduced into an extra gap between an additional ultrasonic oscillator and its matching responder. In this way, a multilayered material band with at least two profiled individual material bands can be provided. Advantageously, the profiling of this additional individual input band is designed to be displaced, that is to say, to be transverse to the longitudinal direction of the band. In this way, it becomes possible to form boxboard with a double layered, corrugated band.

The just described apparatus, among other advantages, adapts itself well to the manufacture of corrugated boxboard. For the binding of the paper bands to one another, it is not necessary to employ a binding material, that is, especially, no adhesive is required. However, it is not excluded, to use a minimal amount of a suitable adhesive, if required.

Further, the just described apparatus adapts itself to the establishment of a binding between material bands, wherein the material contains fiber particles. This would include, for example, paper bands or the like. It is not a requirement, that the individual material bands to be bound together be thermoplastic components, or especially contain thermoplastic plastic material, nor is it required that an adhesive be applied. Thereby, the durability of the material bands is improved and/or the value thereof for recycling is enhanced.

In the case of material bands with fiber particulate, the following binding actions, alone, or in combination with differing proportioning can be activated:

- the microsplicing of the fiber particulate of an individual material band with the fiber particles of another individual material band. When this is undertaken, then, by means of mechanical movement in the ultrasonic field, the particles are released from their original impaction and form, with the likewise released immediately proximal other fiber particulate, a new binding;
- fluids within the material band or in loose condition on the material band are atomized, and so effect a mechanical dissolution of the individual material band in limited invasion areas, so that the disassociated areas can reform themselves; and
- by means of thermal action, the binding material band releases the individual material band (for instance, by the intrusion of water), whereupon, the material band hardens, or "cures", in a reformation of a new binding between two individual material bands which are proximal to one another.

In the manufacture of corrugated boxboard, it has been determined, that no adhesive is necessary for the binding of the paper bands. An application of water prior to the binding is not required, although the application of a small quantity of moisture does enhance holding power between the paper bands. Compared to the conventional production methods for corrugated boxboard, a drying operation must be a subsequent operation for the binding equipment. With the invention, a drying machine section can be omitted or may be substantially reduced in size. By means of the microsplicing of fibers of the adjacent paper bands, the moisture-stability of the so manufactured corrugated boxboard is essentially improved. As compared to conventional corrugated boxboard containing adhesives, paper bands of the invention dissociate only after a long subjection to high humidity.

Embodiment examples are explained in greater detail with the aid of drawings.

DETAILED DESCRIPTION

Reference will not be made in detail to the presently preferred embodiments of the invention, one or more examples which are shown in the figures. Each example is provided to explain the invention, and not as a limitation of the invention. In fact, features illustrated or described as part of one embodiment can be used with another embodiment to yield still a further embodiment. It is intended that the present invention cover such modifications and variations.

Figure 1:
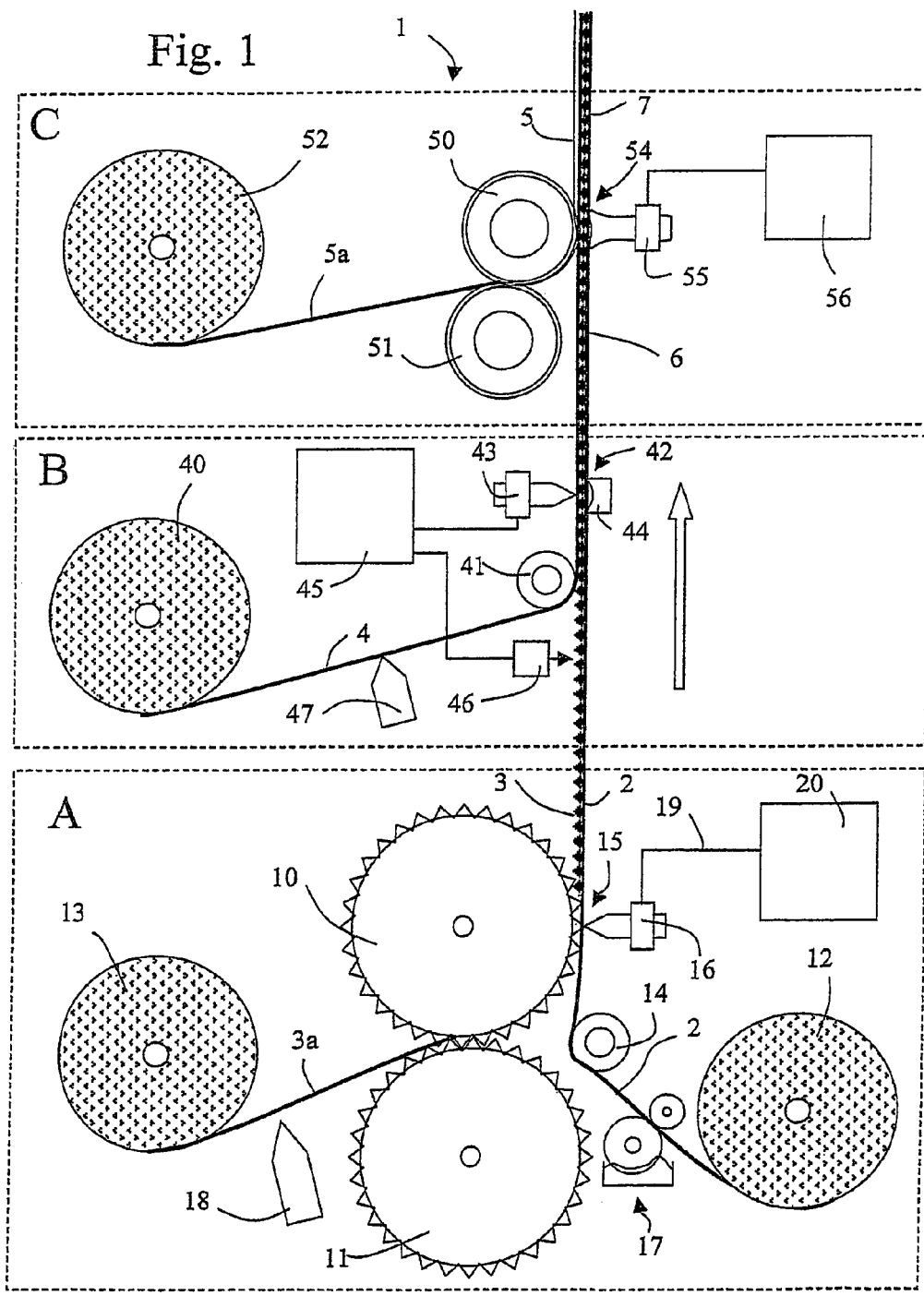
FIG. 1 shows a schematic cross-section of a modular corrugated boxboard manufacturing machine.

FIG. 1 shows a schematic cross-section through a modular corrugated boxboard machine 1. Three modules, namely A, B and C of the corrugation machine 1 are presented. In module A, a first cover band 2 is bound to a first corrugated band 3. In module B, a second cover band 4 is bound to the already bound bands 2, 3. Onto the single corrugated layer boxboard 6 issuing from the module B, in module C a second corrugated band 5 is bound. Not shown, a module D can be placed thereafter, which adds onto the second corrugated band 5 a third cover band, so that a double layered corrugated boxboard 7 has been produced with three cover bands. In module A, a ribbed roll-pair 10, 11, produces a first corrugated band 3 from the paper band 3a. The first corrugated band 3 is profiled transverse to the direction of the band. In module C, another ribbed roll-pair 50, 51 produces from the paper band 5a the second corrugated boxboard band 5. The rib impressions, i.e., the profiling, of this second corrugate boxboard band 5 is aligned in the longitudinal direction of the band, so that, in the case of the double, corrugated layer boxboard 7, the profiling of the corrugated boxboard bands 3, 5 is crossed. The arrow, which points from below to above, shows the running direction for the corrugated boxboard band. The rolls which contact or touch both the paper bands or the cover bands rotate with a circumferential speed which corresponds (approximately) to the travel speed of the bands.

The paper bands, 2, 3a, 4, 5a are, in respective order, fed from paper supply rolls 12, 13, 40 and 52. In module A, the cover band 2, which issues from the first paper supply roll, is diverted by a change of direction roll 14 and is introduced into a first gap 15 between the first ribbed roll 10 and a first ultrasonic oscillator 16. Optionally, between the first paper supply roll 12 and the first gap 15, however, or even more advantageously, between the first change of direction roll 14 and the first paper supply roll 12, can be placed an adhesive roll 17. The adhesive roll 17 possesses an application roll, a pressure roll and an adhesive container, through which the adhesive roll can turn. The application of the adhesive is carried out transversely to the first cover band 2. Optionally, between the second supply paper roll 13 and the ribbed roll-pair 10, 11, a moisturizer 18 could be placed, which would dispense a thin, aqueous film on the paper band 3a. The moisturizer 18 could also be provided between the first gap 15 and the first paper supply roll 12 in the place of the adhesive applicator 17. Another moisturizer could be supplied in addition to the existing moisturizer 18 for the moisturizing of the paper bands 3a and 2.

In module A, the ultrasonic oscillator 16 is connected with a line 19 to an ultrasonic generator 20. The ultrasonic emission is to be radiated from the surface bordering on the first gap 15 and into the gap by means of the ultrasonic oscillator 16. On the opposite side of the gap 15, the ultrasonic emission impinges on an outer surface of the ribbed roll 10.

Figure 7A:
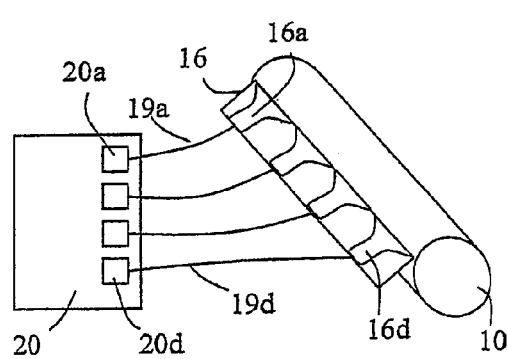
FIGS. 7A and 7B show two embodiments of the arrangement of ultrasonic oscillators transverse to the paper band.

FIG. 7A shows a schematic presentation of the ultrasonic oscillator 16, which is located opposite to the ribbed roll 10. The ultrasonic oscillator 16 is assembled from a plurality of adjacently situated vibratory, or beat, sections 16 a to d. The emitting surfaces of the oscillating sections are longitudinally aligned and run parallel to the roll axis. Each vibratory section 16 a–d, by means of a line 19 a–d, is connected with a power driver 20a–d of the ultrasonic generator 20. The generator 20 can be so operated, that the phase, amplitude and frequency of the power driver 20 a–d are identical. Phase, power, amplitude and frequency, however, can partially differ from power driver to power driver for the optimizing of the operation of the individual beat sections 16 a–d. An example of this would be, if the power output is regulated to be constant in value, while the frequency for the creation of a resonance in the first gap 15 is optimized. One or more beat sections 16a–d allow themselves to be energized or de-energized, only in order to yield an ultrasonic power, at the zone where the corrugated boxboard, that is, the cover band and/or the corrugated band actually runs through. By this ON and OFF switching, the active gap length is adjusted to the necessary corrugated boxboard breadth. The ultrasonic oscillators 43, 70 and/or 71, which are described below, can be accordingly constructed and operated.

In module B, the second cover band 4 is diverted in its travel by a second change of direction roll 41 to the already bound band comprised of the first cover band 2 and the first corrugated band 3. These bands are being introduced into a second gap 42 between a second ultrasonic oscillator 43 and a reflector line 44 to allow bonding. The second ultrasonics oscillator 43 is energized by a second ultrasonic generator 45, and can be designed to correspond to the first ultrasonic oscillator 16. In the second gap 42, the second cover band 4 is brought into contact with the corrugated band 3 and these are bound together along their common touching areas.

A separating distance sensor 46 captures the ridges and valleys of the first corrugated band 3 and sends a signal thereof to the second ultrasonic generator 45. This is done in order to permit a time related power modulation, which would be dependant upon the succession and positions of the ridges, or hills, and valleys. With the forward speed of the corrugated boxboard travel in this area known, a power maximum of the ultrasonics could then be issued, with a lead in time, from the second ultrasonic oscillator 43 in such a manner that, in the inter-layer contact area between the first corrugating band 3 and the second cover band 4, a maximal power impulse would be made available. Optionally, between the third paper supply roll 40 and the second gap 42 there could be installed a moisturizing element 47 or (not shown) an adhesive applicator, which, respectively, would correspond to the moisturizing element 18 or to the adhesive applicator 17 in module A.

The single layer corrugated boxboard is then further transported at the same speed to module C, where it enters a third gap 54. The second corrugated band 5, is fed into this third gap 54. Band 5 has been produced by the coaction of the third and fourth profiled rolls 50, 51. The third gap 54 is bordered upon one surface with a computer controlled, ultrasonic oscillator 55 and bordered on the other surface by the third profiled roll 50. The computer controlled, ultrasonic oscillator 55 is activated by the ultrasonic generator 56. In this third gap 54, the second corrugated band 5 and the second cover band 4 are bound together, so that a double-layered corrugated boxboard 7 has been created.

Figure 7B:
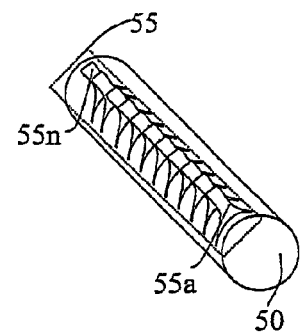

FIG. 7B shows a schematic, top view of the computer controlled, ultrasonic oscillator 55. This computer controlled, ultrasonic oscillator 55 is assembled from oscillator sections 55 a–n. The radiating surfaces of the individual emission sections 55 a–n are designed to run in a longitudinally alignment in the direction of the circumference of the roll 50. Additionally, the emitting surfaces are bent with a radius, which more or less represents the radius of the roll 50 plus the width of the gap 54. The width of the emitting surfaces of an emission section can extend themselves over several ridges of the third profiled roll 50. It is also possible, that per ridge of the profiled roll 50, an oscillation section can be provided. This provision could extend the section over a distance of a multiple of ridge widths. As is seen in the unit of FIG. 7A, the group of individual oscillation sections 55 a–n in FIG. 7B can be synchronously driven together, that is, with the same phase, frequency and power. Alternately, each section oscillator could be individually optimized, as has already been described with reference to FIG. 7A.

Figure 2A:
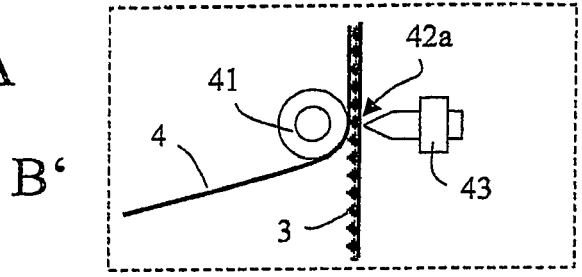
FIGS. 2A and 2B show embodiments of a binding unit for a third paper layer.
Figure 2B:
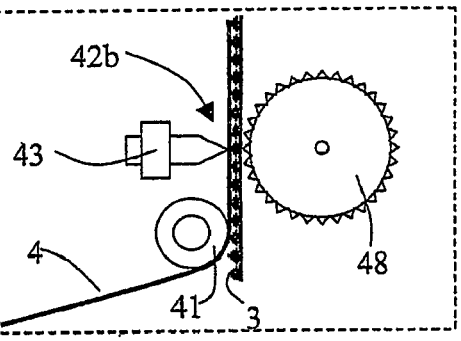

FIGS. 2A and 2B show embodiments of the module B. Insofar as nothing else is given, the same elements are provided. In the case of FIG. 2A, a second gap 42a, between the second ultrasonic oscillator 43 and the change of direction roll 41 is provided. In this case, the reflector line 44 is omitted. The power output of the second line ultrasonic oscillator 43 can once again be so synchronized, that a power maximum is then furnished, when the cover band 4 touches the first corrugated band 3.

In the case of the embodiment as shown in FIG. 2B, instead of the reflector line 44, a ridged roll 48 is provided, the ridge arrangement of which corresponds to the ridge pattern of the first corrugated band 3. This ridge roll 48 is so synchronized with the through-put of the first corrugated band 3, that a projection of the ridge roll 48 then acts as a gap surface of the second gap 42b, since the first corrugated band 3 lies on the second cover band 4. Instead of the change of direction roll 41 in FIG. 2A, that function can be taken over by the ridged roll 48.

Figure 3:
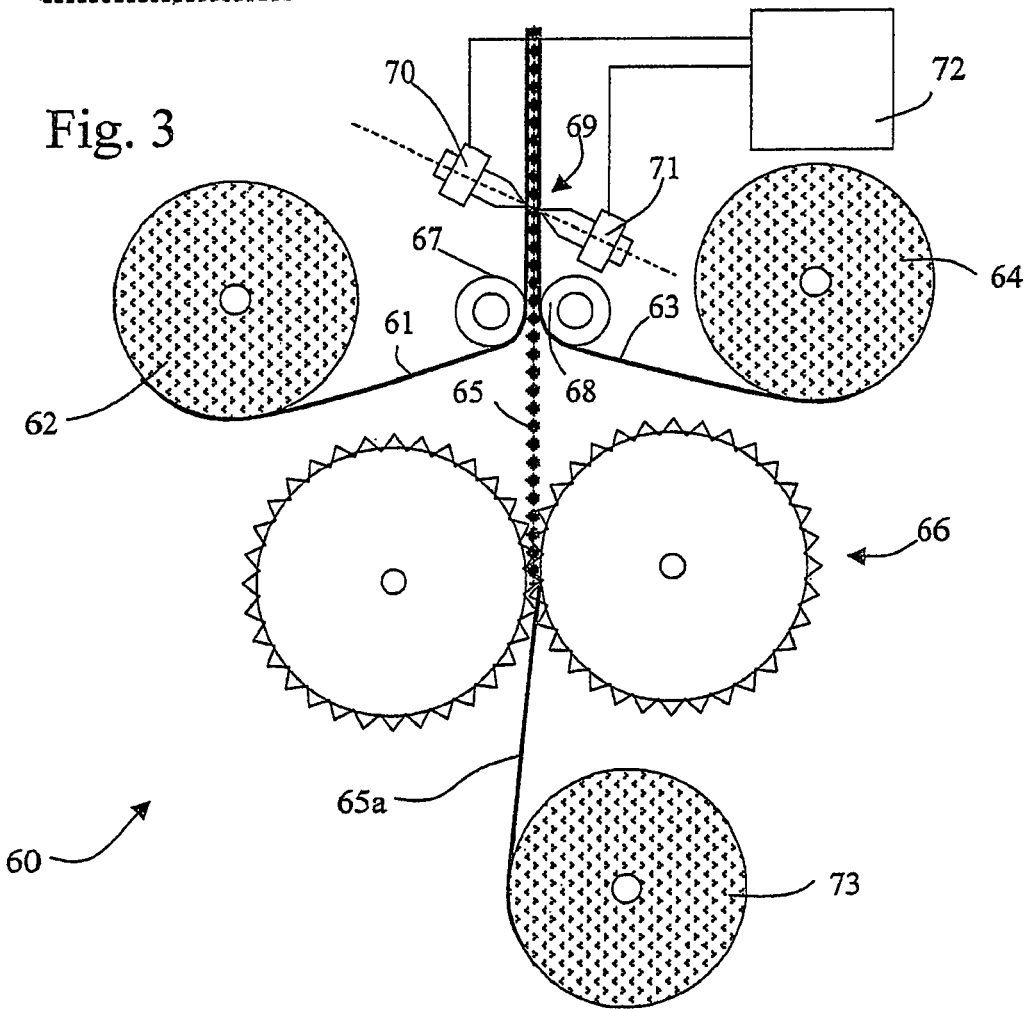
FIG. 3 shows a schematic cross-section of a corrugating boxboard machine in accord with a second embodiment.

FIG. 3 shows an embodiment, of an integrated corrugated boxboard unit 60. From a first paper supply roll 62, a first cover band 61 is conducted over a first change of direction roll 67. From a second paper supply roll 64, a second cover band 63 runs over a second change of direction roll 68. In a simultaneous action, a first corrugated band 65 is produced from a paper band 65a by a ridged roll pair 66. The paper band 65a is conducted by means of a third paper supply roll 73 to the profiled, or ridged, roll pair 66. The three bands, 61, 65, 63 meet together in the gap 69, which is formed by two oppositely bordering line ultrasonic oscillators 70, 71. The line ultrasonic oscillators 70, 71, are driven by an ultrasonic generator 72. The line ultrasonic oscillators 70, 71 can be designed to essentially correspond to the line ultrasonic oscillator which is shown in FIG. 7A. The ultrasonic oscillators 70, 71 are so set, one against the other, that they apply a half wave cross pattern on the first corrugated band 65 which carries over to the bands 61 and 63. In this case, the first corrugated band 65 lies on the first cover band 61 in the area of the ultrasonic producing surface of the first line ultrasonic oscillator 70, when the first corrugation band 65 lies on the second cover band 63 in the area of the ultrasonic producing surface of the second line ultrasonic oscillator 71. It is also possible, to operate passively, one of the line ultrasonic oscillators 70, 71 so that this will be excited to oscillation by the ultrasonics of the other line ultrasonic oscillator unit.

The bands 61, 63, and 65 lying closely, one on the other, are bound together in the gap 69, allowing the constructed size of the integrated corrugating machine module 60 to be significantly reduced. It is further possible that moisture and/or adhesive can be applied one sidedly or two sidedly onto the first cover band 61, onto the second cover band 63 and/or onto the first corrugated band 65. This would be effected by a moisturizing element and/or an adhesives applicator placed in correspondence to FIG. 1. Further modules in the series of C, B, D or B, D can be included.

Figure 4A:
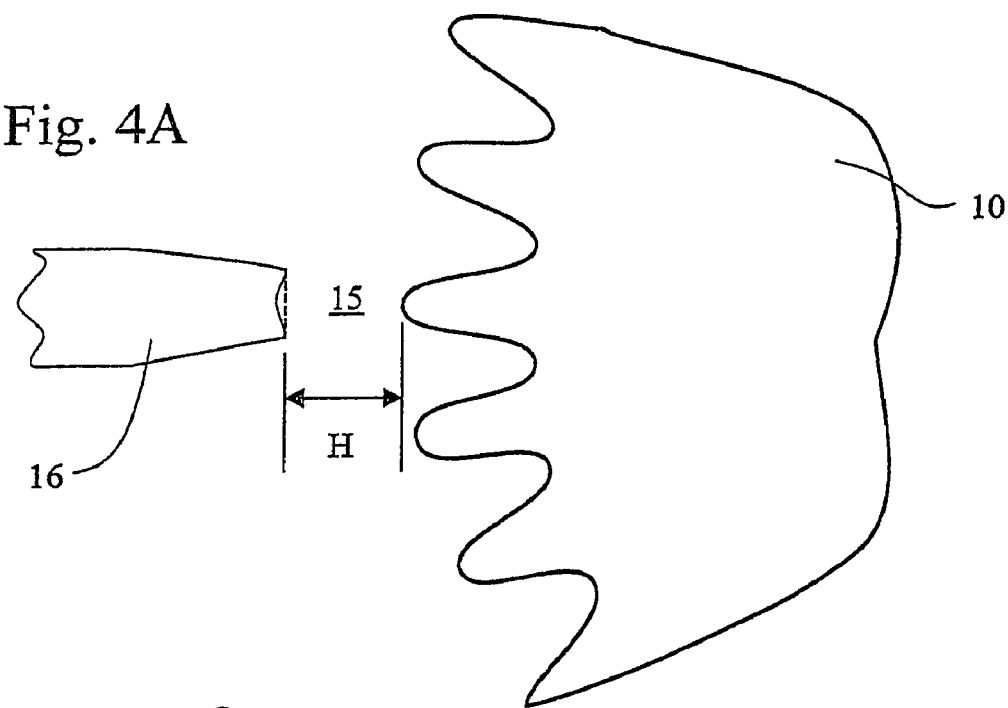
FIGS. 4A to 4C show embodiments of ultrasonic emission and reflection surfaces.
Figure 4B:
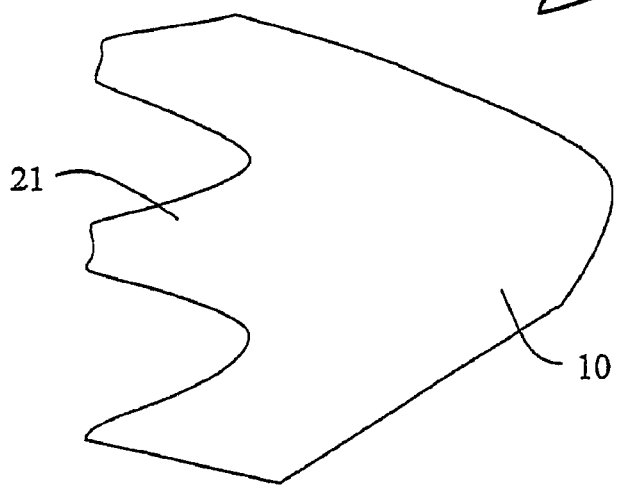

FIG. 4A shows an enlarged illustration of a cross-section of the first ridged row 10 of the first gap 15 with the gap width H and the forward part of the first line ultrasonic oscillator 16. The ultra-sound emitting forward surface of the line ultrasonic oscillator 16 has a bowl-like, or an inward concavity, preferably of parabolic shape or even formed as a partial spherical recess, so that the ultrasonic emission focuses in the direction of the surface of the first ridged roll. The bowl-like depression is aligned in a transverse direction to the paper band (that is to say, perpendicular to the plane of the drawing). FIG. 4B shows an embodiment of the first ridged roll 10, wherein the upper side of the tooth 21 has been flattened. This flattening can be designed to be bowl-like, parabolic, or spherical in shape.

Figure 4C:
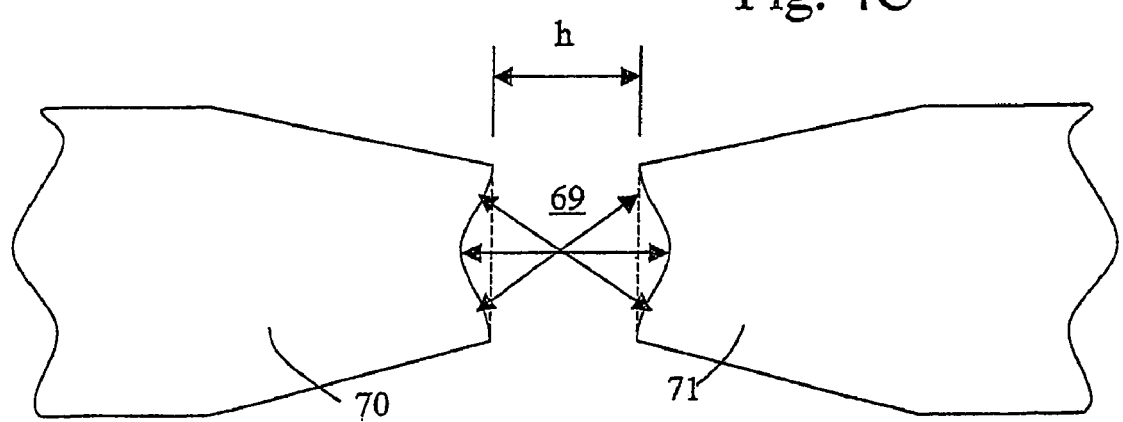

FIG. 4C demonstrates a section of the oppositely situated line ultrasonic oscillators 70, 71 of FIG. 3, enlarged to show some detail. The bordering surfaces of the gap 69 are smooth, and shaped to be bowl-like, parabolic or partially spherical. The depth runs likewise perpendicularly to the plane of the drawing over the breadth of the line ultrasonic oscillator, i.e., the oscillatory section thereof. By changing the frequency, or changing the width of the gap "h", it is possible that a standing wave can be created in the gap 69. The width h of the gap 69 can be a multiple of a quarter of the wave length ($\lambda/4$) of the ultrasonic sound in the gap 69. The standing wave can also be measured as a half-wave length, or a multiple of a half-wave length. The line ultrasonic oscillator 71, can, as already explained, be designed to be passive, in that it principally reflects the radiated sound from the line ultrasonic oscillator, and if necessary, can itself be excited into oscillation or to resonance vibration.

Figure 5A:
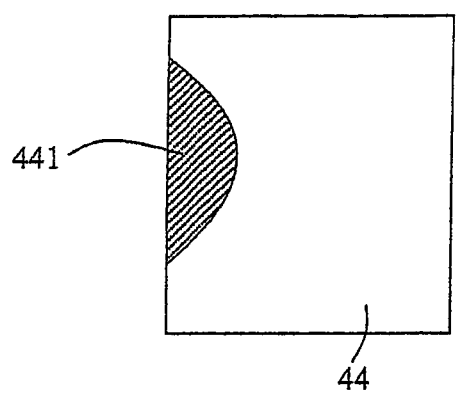
FIGS. 5A and 5B show inserts for ultrasonic reflection surfaces.
Figure 5B:
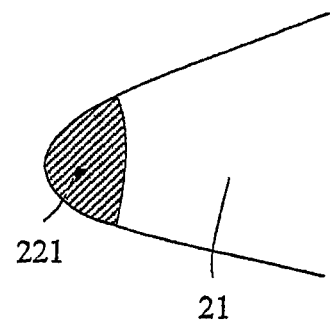

FIG. 5A shows a detailed view of the reflector line 44 of the module B of FIG. 1. The gap bordering surface of the reflector line 44 is likewise designed as a recess. The recess can likewise be again shaped as bowl-like, parabolic, or partially spherical. For the avoidance of contamination deposition the recess 441 is advantageously filled with a substance, which exhibits on the interface area air/material band, a slight ultrasonic reflectivity. Thereby the greatest part of the gap-side impacting ultrasonics penetrates the material band in recess 441 and is first reflected from the curved surface of the recess 441. Thereby, a directed back reflection of the impacting ultrasonic radiation is achieved. FIG. 5B shows an enlarged cross-section of a ridge tip of FIG. 4B, wherein the original tooth apex 21 has an extension 221 of a substance such as the above filling for the recess 441.

Figure 6:
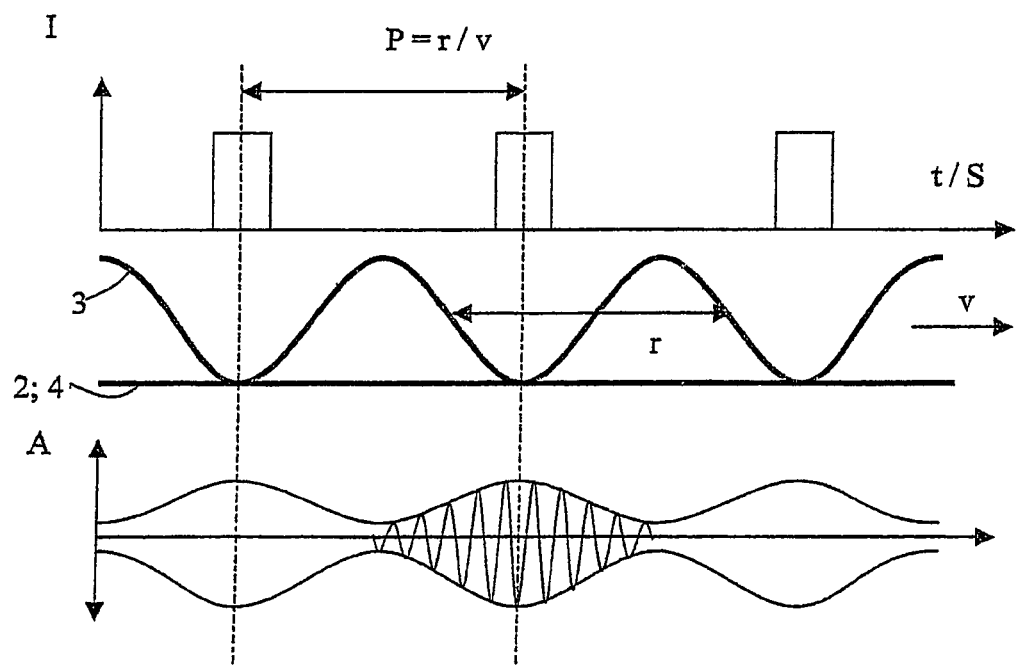
FIG. 6 shows a time diagram of power modulation as assigned to a running corrugated boxboard machine.

FIG. 6 shows an embodiment of the time related course of the power dissipation by the ultrasonic generators 20, 45, 56 and/or 72. While the material band is being pulled through a gap 15, 42, 42a, 42b, 54 and/or 69, at that time, a power maximum is dissipated, when one of the material bands bonds onto one of the other material bands. This is made clear in FIG. 6 by the first corrugated band 3, which lies against either on the first or on the second cover band 2 or 4, respectively. The upper time diagram shows an impulse shaped account of the power I and the lower time diagram shows a time-dependent modulation of the vibratory amplitude A in the form of a beat. The pulse length P is, in this connection, equal to r/v, whereby v is the speed of transport of the corrugated boxboard, and r is the grid dimension of the first corrugated boxboard band 3.

Figure 8A:
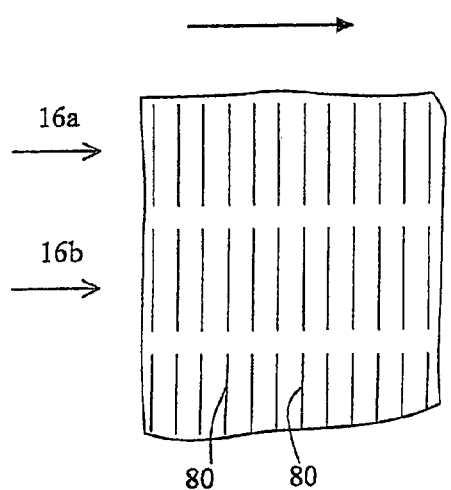
FIGS. 8A and 8B show a binding pattern arising from the arrangement of 7A and 7B.

FIG. 8A depicts a section of the surface of the corrugated boxboard, if, with the arrangement of FIG. 7A, a time related power modulation in accord with FIG. 6 has been carried out. On the corrugated boxboard surface there are to be seen connection zones 80 which are separated from one another according to a transverse placement of the vibratory sections 16 a–d. In the band longitudinal direction, the connection zones 80 correspond to the spacing of the grid dimension r.

Figure 8B:
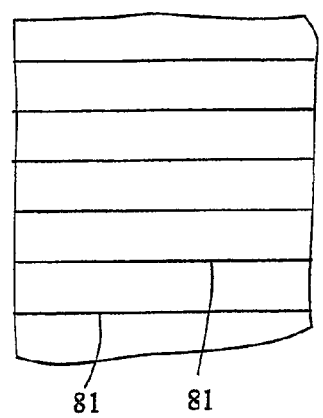

FIG. 8B shows the connection lines, where these, for example, are produced with the arrangement of FIG. 7B. The separating distance between the binding lines 81 correspond to the grid dimensioning of the second corrugating band 5, that is to say, to the separations of vibratory sections 55 a–n. In the case of continued power supplying to the computer unit controlled ultrasonic unit 55, the connection lines 81 are continuous and, in the case of power modulation, are partially interrupted.

A corrugated boxboard machine need not be exclusively designed on the basis of ultrasonic connection modules. One or more of the modules A, B, C, or D can be replaced by one or more of conventional modules. It is also possible that the modules B, C, and/or D can be thereto attached. Conventional modules, for example, incorporate a transfer roller, a splicer, a preheater, a band leader, an adhesive application device, a heater and adhesive curing apparatus, and/or further workup equipment such as cutting and folding machinery.

It will be appreciated by those skilled in the art that various modifications and variations can be made in the present invention without departing from the scope of the invention. It is intended that the present invention include such modifications and variations as come within the scope of the appended claims and their equivalents.

The invention claimed is:

1. A device for binding a multilayer cellulose fiber material band using ultrasonic wave emissions, said device comprising:
    a first in-feed apparatus comprising a source of a flat first individual cellulose fiber material band;
    a second in-feed apparatus comprising a source of a flat second individual cellulose fiber material band, said second in-feed apparatus being capable of profiling said flat second individual material band;

means for aligning said first and second cellulose fiber material bands in direct contact without an intervening material as said bands travel in a running direction;

an application apparatus for application of a liquid devoid of adhesive onto at least one of said first individual material band or said second individual material band to moisturize at least one of said material bands; and means for ultrasonically bonding said first and second cellulose fiber material bands directly together by inducing splicing together of fibers from said bands without an intervening adhesive material between said bands.

2. A device as in claim 1, wherein said bound first and second individual material bands form corrugated boxboard.

3. A device as in claim 1, wherein said second in-feed apparatus includes a profiled roll-pair for profiling said second individual material band.

4. A device as in claim 3, wherein each roll of said profiled roll-pair includes a profiled surface.

5. A device as in claim 3, wherein a first roll of said profiled roll-pair acts as a first ultrasonic responder in said ultrasonic bonding means.

6. A device as in claim 5, wherein said ultrasonic bonding means comprises a first ultrasonic oscillator defining a gap with said responder through which said first and second aligned material bands travel, and wherein peaks of said first roll of said profiled roll-pair include an ultrasonic reflection surface that at least partially reflects the ultrasonic emissions emitting from said first ultrasonic oscillator back to said first ultrasonic oscillator.

7. A device as in claim 6, wherein said ultrasonic reflection surface is a coating.

8. A device as in claim 6, wherein said ultrasonic reflection surface is received in at least one bowl-like shape recess of said at least one second opposing responder in one of a longitudinal direction or a transverse direction.

9. A device as in claim 8, wherein said at least one bowl-like shape recess comprises a plurality of bowl-like shaped recesses.

10. A device as in claim 9, wherein at least one of said bowl-like shaped recesses is filled with a substance that has a lesser ultrasonic reflectivity than said ultrasonic reflection surface.

11. A device as in claim 1, wherein said ultrasonic bonding means comprises a first ultrasonic oscillator defining a gap with a first responder through which said aligned first and second material bands travel, and further comprising a first generator unit in communication with said first ultrasonic oscillator, said first generator unit being capable of modulating power that it supplies to said first ultrasonic oscillator.

12. A device as in claim 11, wherein said power modulation generated by said first generator unit includes a pulse length that is synchronized with a pulse length of a profile modulation of said second material band after said second material band is profiled as said first and second individual material band pass said first ultrasonic oscillator.

13. A device as in claim 12, wherein said first generator unit yields a power maximum when said profiled second individual material band is in contact with said first individual material band as said first and second individual material bands pass said first ultrasonic oscillator.

14. A device as in claim 12, wherein said first generator unit generates an ultrasonic emission from said first ultrasonic oscillator that includes a beat superimposed with at least one of said pulse length of said power modulation or said pulse length of said profile modulation.

15. A device as in claim 1, wherein said ultrasonic bonding means comprises a first ultrasonic oscillator defining a gap with a first responder through which said aligned first and second material bands travel, and wherein a width of said first gap is selectively adjustable so that at least a temporary resonance is created for said ultrasonic emissions within said gap.

16. A device as in claim 1, wherein said application apparatus is configured for application of water onto at least one of said first individual material band or said second individual material band to moisturize at least one of said material bands.

17. A device as in claim 1, further comprising a third in-feed apparatus positioned to guide a flat third individual material band onto the surface of said second individual material band opposite said first individual material band.

18. A device as in claim 17, wherein said ultrasonic bonding means comprises a first ultrasonic oscillator defining a gap with a first responder through which said aligned first and second material bands travel, and further comprising a second ultrasonic oscillator and at least one second responder opposing said second ultrasonic oscillator, said second ultrasonic oscillator capable of emitting ultrasonic waves to bind said third individual material band to said second material band.

19. A device as in claim 18, wherein said second ultrasonic oscillator is positioned to border said third individual material band and said at least one second responder is positioned to border said first individual material band.

20. A device as in claim 18, wherein said at least one second responder includes ultrasonic reflection surface, said ultrasonic reflection surface at least partially reflecting the ultrasonic emissions emitting from said second ultrasonic oscillator back to said second ultrasonic oscillator.

21. A device as in claim 20, wherein said ultrasonic reflection surface is received in at least one bowl-like shape recess of said at least one second opposing responder in one of a longitudinal direction or a transverse direction.

22. A device as in claim 18, wherein said second ultrasonic oscillator and said at least one second opposing responder define a second gap through which said aligned first, second, and third individual material bands pass.

23. A device as in claim 22, wherein said at least one second responder comprises a separate profiled roll.

24. A device as in claim 23, wherein said separate profiled roll corresponds to a profile modulation of said second individual material band.

25. A device as in claim 24, wherein said separate profiled roll rotates at a speed that is synchronized with the speed of travel of the first, second and third individual material bands so that peaks of said separate profiled roll make contact with said first individual material band in alignment with positions where said second individual material band contacts said third individual material band.

26. A device as in claim 22, further comprising a second generator in communication with said second ultrasonic oscillator, said second generator unit being capable of modulating power that it supplies to said second ultrasonic oscillator.

27. A device as in claim 26, wherein said second generator unit yields a power maximum when said profiled second individual material band is in contact with said third individual material band as said first, second and third individual material bands pass said second ultrasonic oscillator.

28. A device as in claim 26, wherein said second generator unit generates an ultrasonic emission from said second ultrasonic oscillator that includes a beat superimposed with at least one of a pulse length of said power modulation or a pulse length of a profile modulation of said second individual material band.

29. A device as in claim 22, further comprising a separating distance sensor for the measurement of the profile of said second individual material band before said second individual material band enters said second gap.

30. A device as in claim 29, further comprising a synchronizing apparatus in communication with said separating distance sensor and said second generator unit, said synchronizing apparatus synchronizing said power modulation generated by said second generator unit with said profile modulation of said second individual material band.

31. A device as in claim 22, wherein a width of at least one of said first gap or said second gap is selectively adjustable so that at least a temporary resonance is created for said ultrasonic emissions within said gap.

32. A device as in claim 22, wherein said width of at least one of said first or said second gap is a multiple of a quarter of a wavelength of the ultrasonic emission within said gap.

33. A device as in claim 22, wherein at least one of said first gap or said second gap extends over about the entire breadth of said material band.

34. A device as in claim 33, wherein the binding of at least one of said first individual material band to said second individual material band or said second individual material band to said third individual material band is continuous or discrete.

35. A device as in claim 18, wherein said first ultrasonic oscillator and the second ultrasonic oscillator are positioned proximal to one another.

36. A device as in claim 18, further comprising a second application apparatus for application of a liquid onto said second or third individual material band to moisturize said third material band.

37. A device as in claim 18, wherein said third individual material band includes cellulose fiber particles.

38. A device as in claim 37, wherein said first individual material band, said second individual material band and said third individual material band comprise paper bands.

39. A process of binding a multilayer material band using ultrasonic wave emissions, the process comprising the steps of:
conducting a flat first individual material band and a flat second individual material band into a first gap between an ultrasonic oscillator and at least one responder;
profiling the second individual material band; and
binding the profiled second individual material band and the first individual material band using ultrasonic emissions from the ultrasonic oscillator without the necessity of an adhesive.

40. A process as in claim 39, further comprising binding a third individual material band to said second individual material band using ultrasonic emissions from a second ultrasonic oscillator.

41. A process as in claim 40, wherein said first, second and third individual material band comprise paper bands.

42. A process as in claim 39, wherein said first and second individual material bands comprise cellulose fiber bands.

43. A process as in claim 40, wherein said process is used to make corrugated paperboard products.

44. A process as in claim 39, further comprising supplying modulated power to said ultrasonic oscillator from a generator unit.

45. A process as in claim 44, wherein said power modulation generated by said generator unit includes a pulse length that is synchronized with a pulse length of a profile modulation of said second material band after said second material band is profiled as said first and second individual material bands pass said ultrasonic oscillator.

46. A process as in claim 45, wherein said generator unit yields a power maximum when said profiled second individual material band is in contact with said first individual material band as said first and second individual material bands pass said ultrasonic oscillator.

47. A process as in claim 45, wherein said generator unit generates an ultrasonic emission from said ultrasonic oscillator that includes a beat superimposed with at least one of said pulse length of said power modulation or said pulse length of said profile modulation.

48. A process as in claim 39, further comprising selectively adjusting said gap between said ultrasonic generator and said responder so that at least a temporary resonance is created for said ultrasonic emissions within said gap.

49. A process as in claim 39, further comprising applying a liquid onto at least one of said first individual material band or said second individual material band to moisturize at least one of said material bands.

\* \* \* \* \*

UNITED STATES PATENT AND TRADEMARK OFFICE
CERTIFICATE OF CORRECTION

PATENT NO.        : 7,220,331 B2
APPLICATION NO.   : 10/496064
DATED             : May 22, 2007
INVENTOR(S)       : Josef Gmeiner Page 1 of 1

It is certified that error appears in the above-identified patent and that said Letters Patent is hereby corrected as shown below:

Column 13, line 37, reads: "second or third individual material band to moisturize said" should read -- third individual material band to moisturize said --

Signed and Sealed this

Thirtieth Day of October, 2007

JON W. DUDAS
*Director of the United States Patent and Trademark Office*